(12) United States Patent
Trim et al.

(10) Patent No.: US 10,599,097 B2
(45) Date of Patent: Mar. 24, 2020

(54) IMAGE AND/OR VIDEO CAPTURE FROM DIFFERENT VIEWING ANGLES OF PROJECTED MIRROR LIKE REFLECTIVE HOLOGRAPHIC IMAGE SURFACE

(71) Applicant: International Business Machines Corporation, Armonk, NY (US)

(72) Inventors: Craig M. Trim, Glendale, CA (US); Christopher J. Dawson, Herndon, VA (US); Christopher L. Molloy, Research Triangle Park, NC (US); John M. Ganci, Jr., Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/989,506

(22) Filed: May 25, 2018

(65) Prior Publication Data

US 2019/0361392 A1    Nov. 28, 2019

(51) Int. Cl.
| | |
|---|---|
| *G03H 1/22* | (2006.01) |
| *G03H 1/00* | (2006.01) |
| *G03H 1/26* | (2006.01) |
| *H04N 5/232* | (2006.01) |
| *H04N 5/225* | (2006.01) |
| *G06K 9/00* | (2006.01) |

(52) U.S. Cl.
CPC .............. *G03H 1/0005* (2013.01); *G03H 1/26* (2013.01); *H04N 5/2259* (2013.01); *H04N 5/23219* (2013.01); *G03H 2227/02* (2013.01); *G06K 9/00221* (2013.01)

(58) Field of Classification Search
None
See application file for complete search history.

(56) References Cited

U.S. PATENT DOCUMENTS

| | | |
|---|---|---|
| 5,461,499 A | 10/1995 | Sugita et al. |
| 7,420,733 B1 | 9/2008 | Natarajan et al. |
| 9,210,319 B2 | 12/2015 | Rav-Acha et al. |
| 9,256,204 B2 | 2/2016 | Huys et al. |
| 2004/0175627 A1 | 9/2004 | Sutherland et al. |

(Continued)

OTHER PUBLICATIONS

P. Mell, et al. "*The NIST Definition of Cloud Computing*", NIST Special Publication 800-145, Gaithersburg, MD, Sep. 2011.

(Continued)

*Primary Examiner* — Christopher G Findley
(74) *Attorney, Agent, or Firm* — Robert Shatto, Esq.; George S. Blasiak, Esq.; Heslin Rothenberg Farley & Mesiti P.C.

(57) ABSTRACT

Systems, methods, and computer program products are presented. The system, for instance, includes a mobile device having a hologram emitter, an imager, memory, at least one processor in communication with memory, and program instructions executable by one or more processor via the memory to perform a method including projecting, from the hologram emitter of the mobile device, a holographic image having a mirror-like reflective surface at a position and an orientation from the mobile device, and obtaining, from the imager of the mobile device, image data and/or video data of a reflection of an object reflected off the projected holographic mirror-like reflective surface.

17 Claims, 11 Drawing Sheets

(56) References Cited

U.S. PATENT DOCUMENTS

2010/0302393 A1    12/2010  Olsson et al.
2015/0116454 A1*    4/2015  Kim .................... G03H 1/0486
                                                        348/40
2015/0220058 A1     8/2015  Mukhtarov et al.
2016/0109953 A1     4/2016  Desh

OTHER PUBLICATIONS http://holowiki.org/Photographing_Holograms, last modified Nov. 5, 2013; accessed Jan. 18, 2017.
https://en.wikipedia.org/wiki/Bragg%27s_law, last modified Nov. 24, 2016; accessed Jan. 18, 2017.
https://physics.stackexchange.com/questions/45763/can-thick-film-reflection-holograms-be-used-to-create-true-mirrors, last modified Dec. 3, 2012; accessed Mar. 28, 2018.
T. Jeong, "*Basic Principles and Applications of Holography*" Fundamentals of Photonics, Module 1.10, https://spie.org/Documents/Publications/00%20STEP%20Module%2010.pdf, 2010.
E. Cervantes "*Samsung Files Patent for Smartphone that can Display Holographic Images*", https://www.androidauthority.com/samsung-patent-smartphone-holographic-images-633167/, Aug. 11, 2015.
T. Kakue, "*Aerial Projections of Three-Dimensional Motion Pictures by Electroholography and Parabolic Mirrors*" https://www.ncbi.nlm.nih.gov/pmc/articles/PMC4648394/, Jul. 8, 2015.
J. Lunazzi "*New Possibilities in the Utilizxation of Holographic Screens*,", Proc. SPIE 1667, Practical Holography VI, doi: 10.1117/12.59647; https://doi.org/10.1117/12.59647 , May 1, 1992.

* cited by examiner

IMAGE AND/OR VIDEO CAPTURE FROM DIFFERENT VIEWING ANGLES OF PROJECTED MIRROR LIKE REFLECTIVE HOLOGRAPHIC IMAGE SURFACE

BACKGROUND

People often take pictures of one's self in a mirror. In such a situation, a camera takes a photograph of the reflection of the person in the mirror.

Recently, mobile devices such as smart phones are capable of displaying a holographic images.

SUMMARY

Shortcomings of the prior art are overcome, and additional advantages are provided, through the provision, in one aspect, of a system. The system can include, for example, a mobile device having a hologram emitter, an imager, memory, at least one processor in communication with memory, and program instructions executable by one or more processor via the memory to perform a method including projecting, from the hologram emitter of the mobile device, a holographic image having a mirror-like reflective surface at a position and an orientation from the mobile device, and obtaining, from the imager of the mobile device, image data and/or video data of a reflection of an object reflected off the projected holographic mirror-like reflective surface.

In another aspect, the system can include, for example, the method operable for projecting, from a hologram emitter of a mobile device, a holographic image having a mirror-like reflective surface at a position and an orientation from the mobile device, detecting, using the imager of the mobile device, the object in the reflection of the object reflected off the holographic mirror-like surface, adjusting, in response to the detected object in the reflection of the object reflected off the holographic mirror-like surface, at least one parameter of the hologram emitter of the mobile device to adjust the position and/or orientation of the mirror-like reflective surface of the holographic image, and obtaining, from the imager of the mobile device, image data and/or video data of the reflection of the object reflected off the adjusted projected holographic mirror-like reflective surface.

In another aspect, the system can include, for example, the method operable for projecting, from a hologram emitter of a mobile device, a holographic image having the mirror-like reflective surface relative to an obstruction disposed along a line-of-sight between the mobile device and an object, and obtaining, from an imager of the mobile device, an image or a video, using the imager of the mobile device, of a reflection of an object disposed beyond the obstruction.

In another aspect, a method can be provided. The method can include, for example, projecting, from a hologram emitter of a mobile device, a holographic image having a mirror-like reflective surface at a position and an orientation from the mobile device, and obtaining, from an imager of the mobile device, image data and/or video data of a reflection of an object reflected off the projected holographic mirror-like reflective surface.

In another aspect, the method can include, for example, the projecting including projecting, from the hologram emitter of the mobile device, the holographic image having the mirror-like reflective surface relative to an obstruction disposed along a line-of-sight between the mobile device and the object, and the obtaining including obtaining, from an imager of the mobile device, the image data or the video data, of the reflection of the object disposed beyond the obstruction.

In a further aspect, a computer program product can be provided. The computer program product can include a computer readable storage medium readable by one or more processing unit and storing instructions for execution by one or more processor for performing a method. The method can include, for example, projecting, from a hologram emitter of a mobile device, a holographic image having a mirror-like reflective surface at a position and an orientation from the mobile device, and obtaining, from an imager of the mobile device, image data and/or video data of a reflection of an object reflected off the projected holographic mirror-like reflective surface.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figures 1, 2:
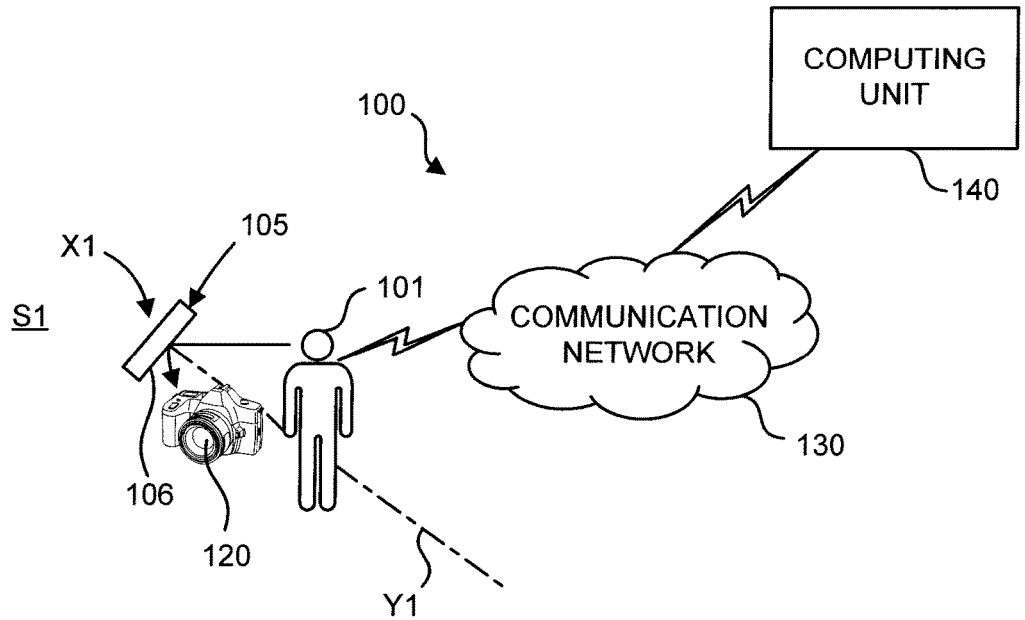
FIG. 1 is a diagrammatic illustration of an imaging system according to one embodiment.
FIG. 2 is flowchart illustrating a method that can be performed by the system of FIG. 1 according to one embodiment.

FIG. 1 depicts a system 100 for obtaining an image or a video of one or more objects 101 which employs a holographic image 105 having a mirror-like reflective surface 106 disposed at a position X1 and orientation Y1 according to one or more embodiments set forth herein. For example, position X1 and orientation Y1 may be defined in three-dimensional space S1. Implementing the technique of the present disclosure may enhance the ability of obtaining images or videos. For example, a user of the system, which creates a virtual mirror dynamically, may more easily obtain an image of one self alone or with others in a mirror compared to holding and angling a conventional camera or smartphone having a fixed camera and a fixed mirror to obtain an image of one self alone or with others in a mirror. The invention may provide the ability to define or tag objects and people. Suitable application software may perform image recognition of the object or person in the camera view using a cognitive system image analytics processing capability to identify the object or person match, and then capture a photo or video of a person or object in the mirror like reflective holographic surface. The invention may provide the ability to define the optimal or desired viewing angle and directional coordinates to project the mirror like holographic image to capture a photo or video of the object or person (e.g., front, left side, right side, and back).

As explained in greater detail below, in one embodiment, system 100 may generally include a mobile device 120 having a hologram emitter for projecting holographic image 105 having mirror-like reflective surface 106 and an imager system for obtaining images and/or videos. Mobile device 120 may be operably connected to a communication network 130, which communication network is operably connect to a remote computing unit 140. In some embodiments, the mobile device 120 may include a computing unit such as a smartphone.

FIG. 2 depicts a flowchart of a method 200 performed by system 100 of FIG. 1 according to one or more embodiments set forth herein. Method 200 includes, for example, at 210 projecting, from a hologram emitter of a mobile device, a holographic image having a mirror-like reflective surface at a position and an orientation from the mobile device, and at 220 obtaining, from an imager of the mobile device, image data and/or video data of a reflection of an object reflected off the projected holographic mirror-like reflective surface.

The method may further include detecting, using the imager of the mobile device, the object in the reflection of the object reflected off the holographic mirror-like surface, and the obtaining may include obtaining, from the imager of the mobile device in response to the detection of the object, the image data and/or video data of the reflection of the object reflected off the projected holographic mirror-like reflective surface. For example, the detected object may correspond to a predetermined object. Predetermined objects may be a generic image of a person or an image of a specific person. The detected object may be a user input identifying the object such as an input by a user identifying the object on a display screen of the mobile device.

Figure 3:
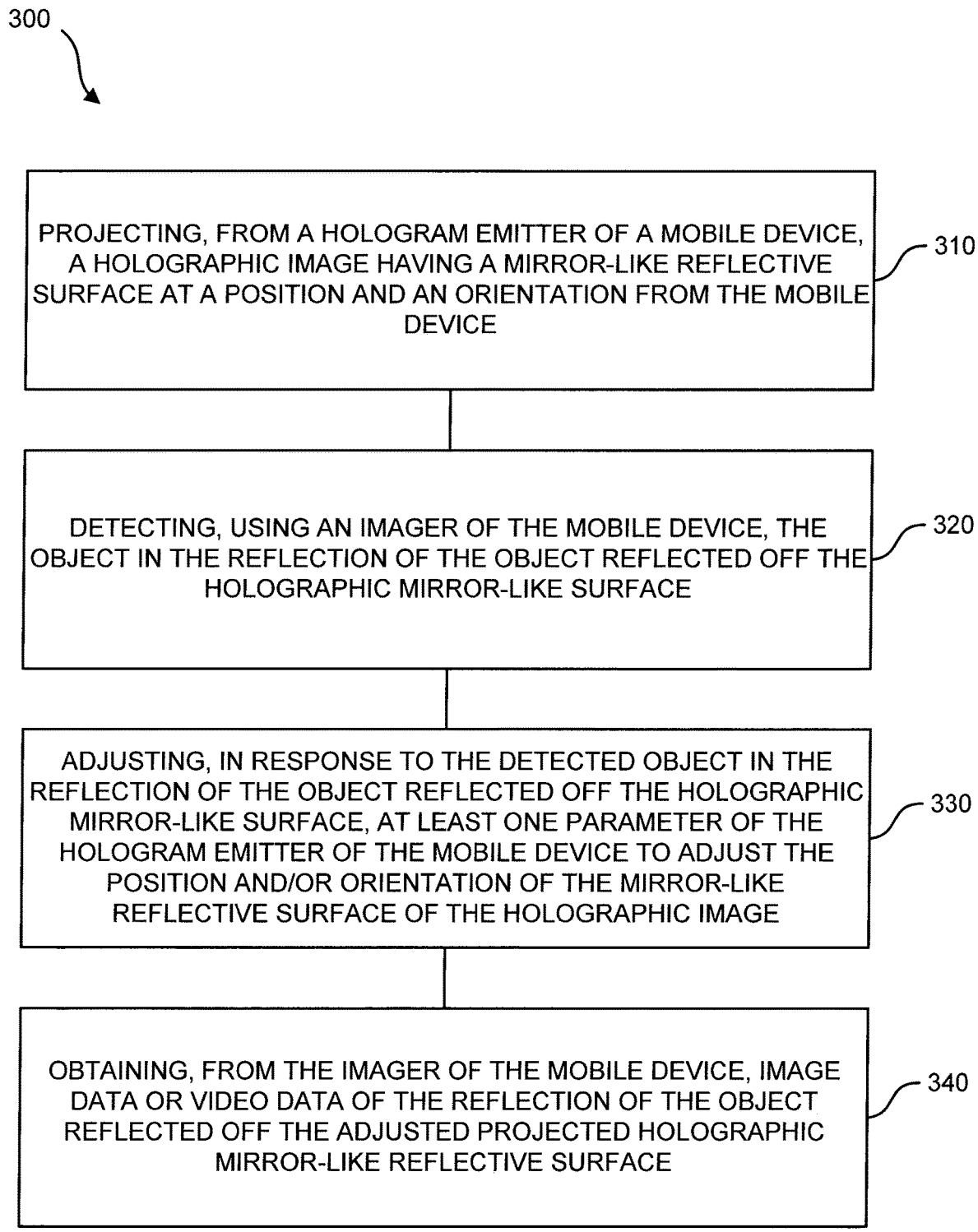
FIG. 3 is flowchart illustrating a method that can be performed by the system of FIG. 1 according to one embodiment.

FIG. 3 depicts a flowchart of a method 300 performed by system 100 of FIG. 1 according to one or more embodiments set forth herein. Method 300 includes, for example, at 310 projecting, from a hologram emitter of a mobile device, a holographic image having a mirror-like reflective surface at a position and an orientation from the mobile device, at 320 detecting, using the imager of the mobile device, the object in the reflection of the object reflected off the holographic mirror-like surface, at 330, adjusting, in response to the detected object in the reflection of the object reflected off the holographic mirror-like surface, at least one parameter of the hologram emitter of the mobile device to adjust the position and/or orientation of the mirror-like reflective surface of the holographic image, and at 340 obtaining, from the imager of the mobile device, image data and/or video data of the reflection of the object reflected off the adjusted projected holographic mirror-like reflective surface. In some embodiments, the adjustment of the at least one parameter of the hologram emitter of the mobile device to adjust the position and/or orientation may be employed to obtain image data and/or video data of an optimized reflection of the object reflected off the adjusted projected holographic mirror-like reflective surface, such as by facial recognition of the reflection of the object reflected off the projected holographic mirror-like reflective surface.

Figures 4, 5:
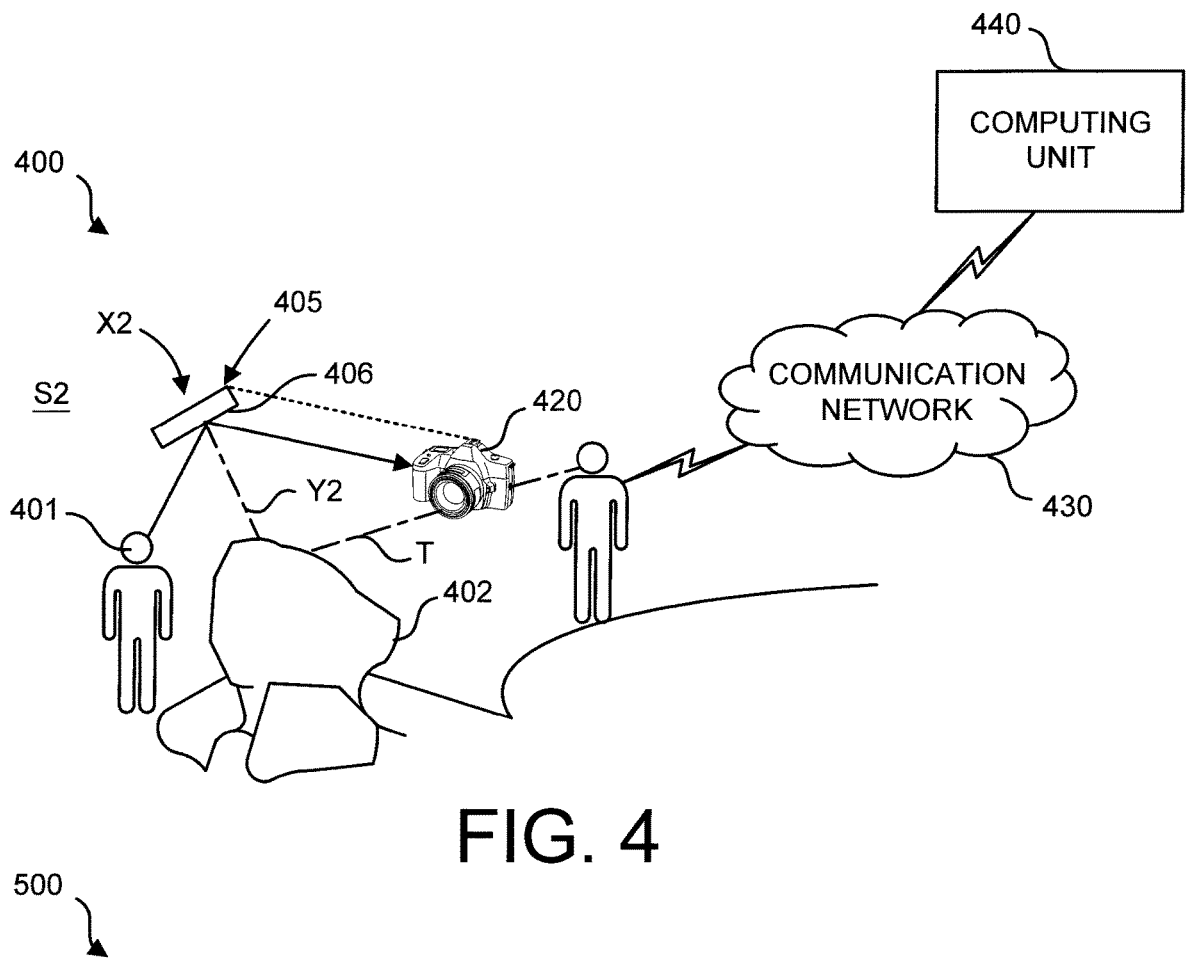
FIG. 4 is a diagrammatic illustration of an imaging system according to one embodiment.
FIG. 5 is flowchart illustrating a method that can be performed by the system of FIG. 4 according to one embodiment.

FIG. 4 depicts a system 400 for obtaining an image or a video of one or more objects 401 obstructed by an obstruction 402 disposed along a line of sight T, which employs a holographic image 405 having a mirror-like reflective surface 406 projected at a position X2 and orientation Y2 according to one or more embodiments set forth herein. For example, position X2 and orientation Y2 may be defined in three-dimensional space S2. Implementing the technique of the present disclosure may enhance the ability of obtaining images or videos obscured by an obstruction. For example, a user of the system may obtain an image of an object obscured by an object compared to being unable with a conventional camera or smartphone having a fixed camera to obtain an image of the obstructed object from the same location. In this embodiment, a projected holographic image with reflective mirror like surface disposed at different angles in 360 degrees direction around a physical obstruction from the mobile device can take a photograph or video of a person or object in a mirror like reflective holographic surface. This approach overcomes a user required carrying physical devices such as a stand or selfie stick. The invention may provide the ability to define or tag objects and people. Suitable application software may perform image recognition of the object or person in the camera view using a cognitive system image analytics processing capability to identify the object or person match beyond the obstruction, and then capture a photo or video of a person or object in the mirror like reflective holographic surface. The invention may provide the ability to define the optimal or desired viewing angle and directional coordinates to project the mirror like holographic image to capture a photo or video of the object or person (e.g., front, left side, right side, and back) obstructed form view by an obstruction.

As explained in greater detail below, in one embodiment, system 400 may generally include a mobile device 420 having a hologram emitter for projecting holographic image 405 having mirror-like reflective surface 406 and an imager system for obtaining images and/or videos. Mobile device 420 may be operably connected to a communication network 430, which communication network is operably connect to a remote computing unit 440. In some embodiments, the mobile device 420 may include a computing unit such as a smartphone.

FIG. 5 depicts a flowchart of a method 500 performed by system 400 of FIG. 4 according to one or more embodiments set forth herein. Method 500 includes, for example, at 510 projecting, from a hologram emitter of a mobile device, a holographic image having the mirror-like reflective surface relative to an obstruction disposed along a line-of-sight between the mobile device and an object, and at 520 obtaining, from an imager of the mobile device, an image or a video, using the imager of the mobile device, of a reflection of an object disposed beyond the obstruction.

For example, the projecting of the holographic image having the mirror-like reflective surface may be to the left or to the right of the obstruction. The projecting of the holographic image may be beyond the obstruction.

The method may further include detecting, using the imager of the mobile device, the object in the reflection of the object beyond the obstruction reflected off the holographic mirror-like surface, and wherein the obtaining includes obtaining, from an imager of the mobile device in response to the detection of the object, the image data and/or video data of the reflection of the object beyond the obstruction reflected off the projected holographic mirror-like reflective surface. For example, the detected object may correspond to a predetermined object. Predetermined objects may be a generic image of a person or an image of a specific person. The detected object may be a user input identifying the object such as an input by a user identifying the object on a display screen of the mobile device.

Figure 6:
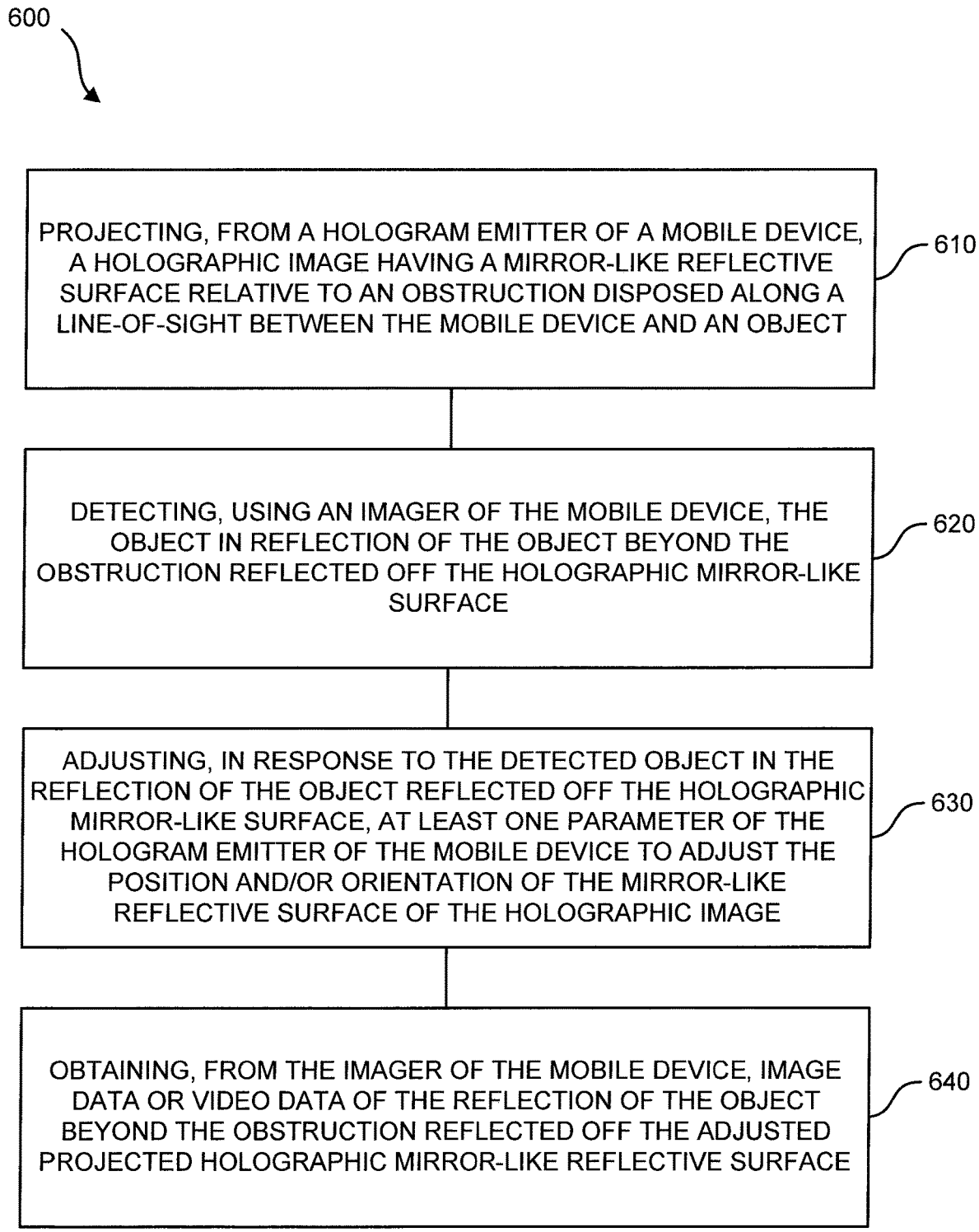
FIG. 6 is flowchart illustrating a method that can be performed by the system of FIG. 4 according to one embodiment.

FIG. 6 depicts a flowchart of a method 600 performed by system 400 of FIG. 4 according to one or more embodiments set forth herein. Method 600 includes, for example, at 610 projecting, from a hologram emitter of a mobile device, a holographic image having the mirror-like reflective surface relative to an obstruction disposed along a line-of-sight between the mobile device and an object, at 620 detecting, using the imager of the mobile device, the reflection of the object beyond the obstruction reflected off the holographic mirror-like surface, at 630 adjusting, in response to the detected object in the reflection of the object reflected off the holographic mirror-like surface, at least one parameter of the hologram emitter of the mobile device to adjust the position and/or orientation of the mirror-like reflective surface of the holographic image, at 640 obtaining, from the imager of the mobile device, image data and/or video data of the reflection of the object beyond the obstruction reflected off the adjusted projected holographic mirror-like reflective surface.

Figure 7:
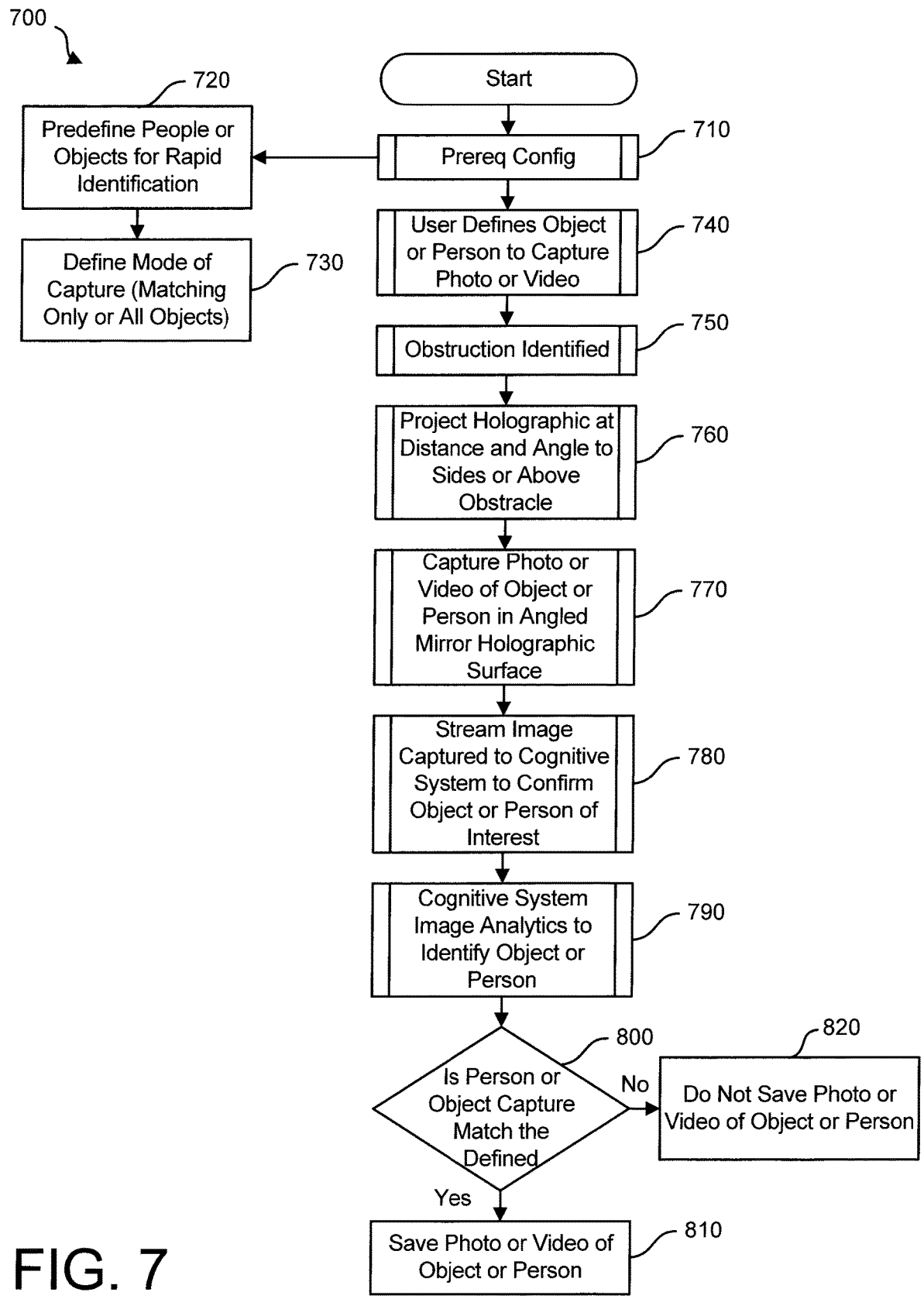
FIG. 7 is flowchart illustrating a method that can be performed by the system of FIG. 4 according to one embodiment.

FIG. 7 depicts a flowchart of a method 700 performed by system 400 of FIG. 4 according to one or more embodiments set forth herein. Method 700 includes, for example, at 710 preconfiguring the mobile device such as at 720 predefining people or objects for rapid identification, and at 730 defining a mode of capture (matching only or all objects). At 740 a user may define an object or person to capture photo or video, at 750 an obstruction is identified, and at 760 a holographic image is projected at distance and angle to the sides or above the obstruction. At 770, a photo or a video is captured of the object or person in an angled mirror holographic surface. At 780, an image captured is transferred to a remote computing unit having cognitive system to confirm object or person of interest. At 790 the computing unit cognitive system image analytics employed to identify the object or the person. At 800, if the person or the object captured matches the defined object or person, at 810 the photo or images of the object or person is saved. At 820 if the person or the object captured does not match the defined object or person, the image or video is not saved. A user may begin the process again at 720.

In an embodiment, a user may physically point the imaging device in direction of where to project the holographic image and in turn capture an image or a video in reflection. The user may point the camera in 360 degrees around the object or person depending on their vantage point (e.g., left, right, behind, etc.). When an image or video is desired around an obstruction, the mobile device maybe operable to conventionally measure distance to the obstruction. A holographic image can then be projected at that distance or at a slightly greater distance in a pattern around the obstruction for different viewing angles. For example, the projected holographic image may be projected to right of the obstruction, then move 10 degrees until you reach other side of obstruction. The process may be an automated sequence. Alternatively, a user may manually position the device and thus the holographic image at the as desired location. The objects such as people may be moving, thus a user may first select the subject in a view finder to tag as object they wish to capture. The object or object may be defined by selecting from predefined list of names, or entering text to describe the object such as a person. In the case of a user defining objects or people from text, visual identification of the object may be made by a cognitive system image analytics component of the mobile devise or at a remote location. For example, a user defines the object/person to capture by selecting name or predefined image (e.g., pic of person), or enters text in mobile device interface (e.g., touchscreen display). Alternatively, the object or person may be automatically identified. Software on the mobile device or at a remote location can initiate search on a cognitive system for known people or objects of the name defined. If identification is not found in an existing database, a search can be performed on external data sources such as social media. Cognitive image analytics can be used to compare and identify an object or person's facial recognition. If still not identified, an interface may alert the user that manual selection is needed. At this stage, knowing the object or people to capture, a holographic image is projected in the direction and viewing angle for desired reflection of the object. Based on the input of the user or optimization performed by system, the holographic image will be projected from the mobile device. The direction can be to left or right of the object, or past subject such that reflection could show someone or object behind a physical obstructions such as a pole. The height of the projection of holographic image can also be considered. Next, the 3D holographic image size, shape and multi side surface can be projected in way of providing specific angle to create mirror like surface in the reflective holographic image. An imager or camera of the mobile device can aim at the mirror like surface of the projected holographic image and capture a reflection of the object or person as the desired photo or video.

Figure 8:
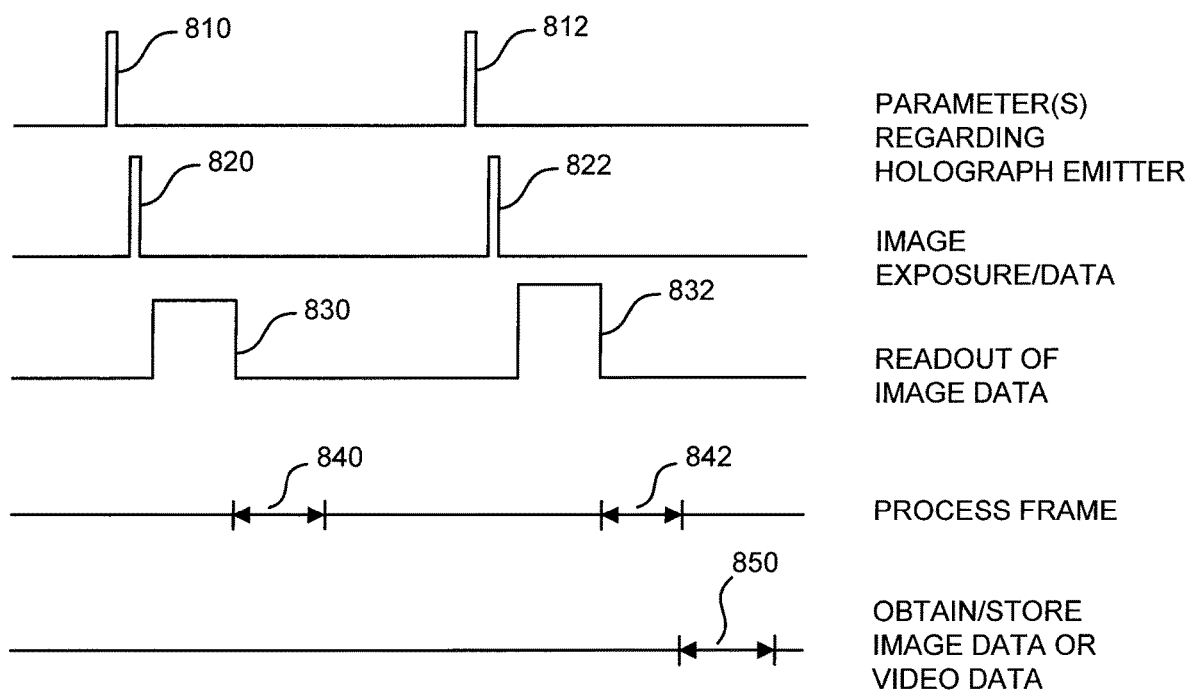
FIG. 8 is a timing/sequence diagram illustrating one embodiment operable for obtaining an image or video using the systems for FIGS. 1 and 4, and employing the methods of FIGS. 2, 3, and 5-7.

FIG. 8 illustrates operational timing and signal diagrams in connection with an operation of the systems described herein for imaging or videoing an object. For example, in one embodiment, the systems may employ signals operable for projecting a holographic image having a reflective mirror-like surface, adjusting the position and location of the holographic image having a reflective mirror-like surface, and obtaining an image or video.

In this illustrated embodiment, a signal 810 may be generated for use in controlling the hologram emitter for projecting a first holographic image at a first position and orientation. For example, the signal may be in response to the user providing an input to the mobile device using an input device such as a touchscreen display to indicate the desire to take a photograph of one's self, or the user providing an input to the mobile device using an input device such as a touchscreen display to take a photograph of an object.

Thereafter, in response to signal 810, an exposure period 820 of the imager may be performed such as the image sensor array of the mobile device being sensitive to light incident thereon of the reflection from the holographic image.

Signal 830 is a readout of a frame or data contained in the exposed pixels in the image sensor array being transferred to memory or secondary storage in the imager so that the imager may be operable to being ready for another exposure.

Period 840 is a period in which the computing unit may process the frame of image data. Such processing may include analytics of the object. For example, comparison may be made to preexisting criteria, facial recognition, or optimization. If the image data is not acceptable, the processor may adjust one or more parameters for controlling the position and/or orientation of the holographic image having the mirror-like reflective surface and the sequence repeated at 812, 822, 832, and 842.

If the processing of the frame of image data is acceptable, the data may be processed at 850 and stored in memory. If a video is designed, frames of image data may be obtained and stored.

It will be appreciated to those skilled in the art that other operational timing and signal diagrams may be suitably employed.

Figure 9:
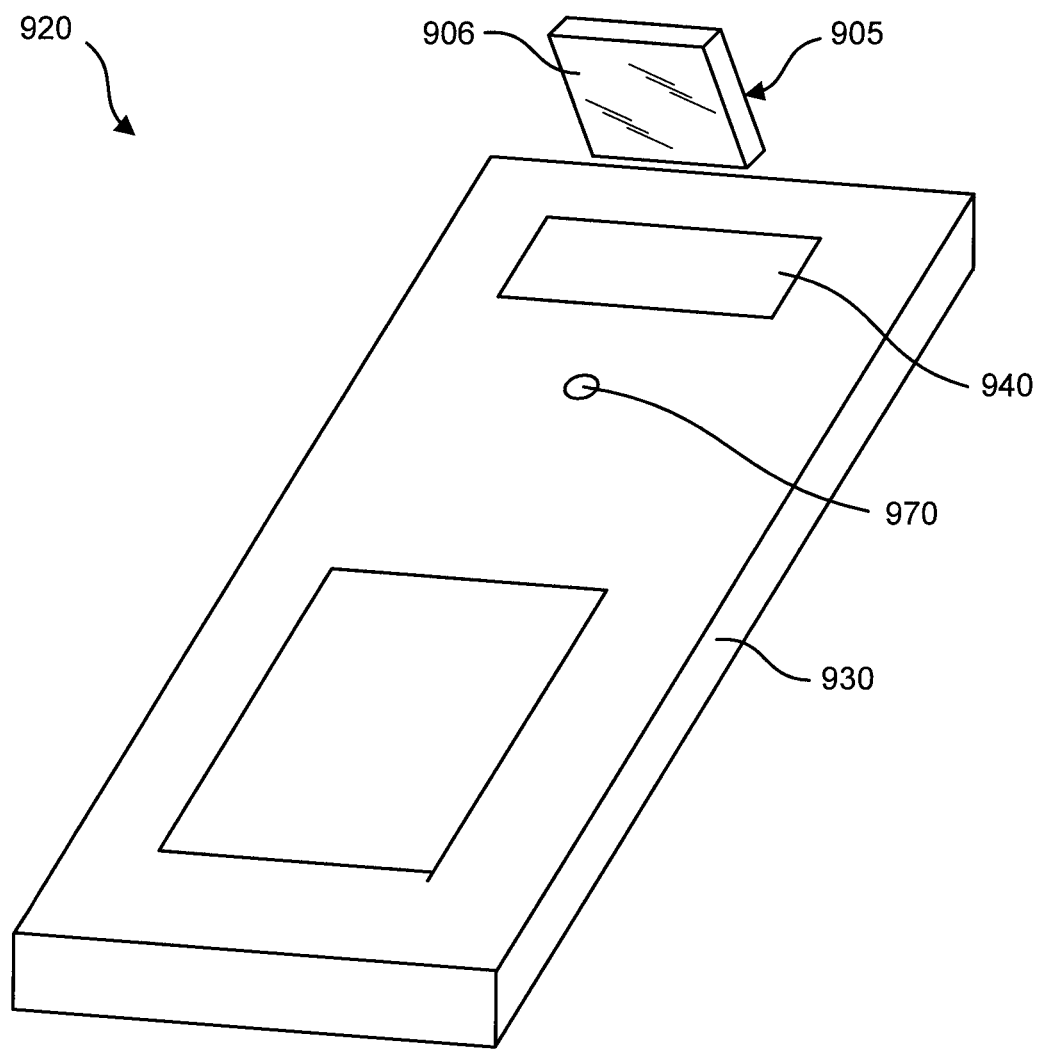
FIG. 9 depicts a mobile device capable of displaying a holographic image and obtaining an image or video of an object according to one or more embodiments set forth herein.

With reference to FIG. 9, a mobile device 920 according to one embodiment may be capable of displaying a holographic image 905 having a mirror-like reflective surface 906. For example, mobile device 920 may include a main body 930, a hologram emitter 940, and an imager 970.

For example, a suitable hologram emitter may include a light source such as one or more lasers or light emitting diodes (LEDs) and a hologram. Suitable optical components such one or more lenses, one or more light guides or reflective surfaces may be operably disposed between the light sources and the hologram for operably controlling, e.g., via a computing unit, the direction and location of the light from the light source to the hologram so that the holographic image having the reflective surface can be variably positioned and orientated relative to the mobile device 920. The suitable optical components may result in parallel light for illuminating the hologram. The illumination from the light source as directed by the optical components results in a three-dimensional holographic image stored in the hologram being displayed above the hologram emitter.

Although one holographic image is illustrated, a hologram emitter may emit a plurality of holographic images using a plurality of different hologram. The different holograms and projected holographic images may provide reflective surfaces at different positions and orientations. The different holograms and projected holographic images may provide a multilayers holographic image having a mirror like reflective surface, which multilayers may be operably adjustably positioned and orientated.

The hologram emitter may employ one or more transmission holograms with light directed from behind the hologram, the illumination light passing through the hologram, and the image transmitted to the observer's side. In other embodiments, a hologram emitter may employ one or more reflection holograms when illumination light is reflected by the hologram. The light source may be monochrome light having a single wavelength, or include a plurality of wavelengths. It will be appreciated that still other suitable hologram emitter systems may be employed. In addition, a mobile device may have one or more hologram emitter systems, such as one for obtaining images or videos of the user in close proximity, and one for obtaining images or videos around an obstruction. Still other hologram emitters may employ a thick film hologram such as a thick film reflective hologram. The holographic image may be planar member having a mirror-like reflective surface. It will be appreciated that other holographic image having reflective surfaces may be employed such as convex reflective surfaces, concave reflective surfaces, etc.

In other embodiments, the hologram emitter may be a laser-based volumetric display system that draws holographic images or volumetric images in the air using light. The system is able to modify air within a volume of space, allowing laser beams to refract and reflect on it. The system is able to create 3D projections which can be seen by multiple observers from different locations. For example, the system may have one or more images of a planar member having a mirror-like reflective surface stored, e.g., in the mobile device or at a remote location. Alternative, coding may be stored in memory of the mobile device or at a remote location which coding is operable for forming a holographic image or object having a reflective surface. The surface may be planar as defined by four points in space which each point having X, Y, and Z coordinates. Repositioning or reorienting of the surface may be made by adjusting the coordinates. It will be appreciated that other surfaces such as convex, concave, etc. may be suitably employed. The volumetric images may be disposed adjacent to the mobile devices described above for obtaining images of one's self, or at a distance for obtaining images and videos at a distance and around an obstructions. The one or a plurality of lasers may be employed to produce a multilayer holographic image having a mirror like reflective surface, which multilayers may be operably adjustably positioned and orientated.

To view objects beyond an obstruction, the camera or imager may be employed to determine the distance, e.g., employing a rangefinder such as a digital rangefinder. The holographic image may then be projected in a pattern around the obstruction for different viewing angles. For example, the project holographic image may be projected to the right of obstruction, then move 10 degrees until the other side of obstruction is reached. The sequence may be an automated sequence. Alternatively, a user may manually select the distance or identify the position using a touchscreen display of the scene having the obstruction.

Figure 10:
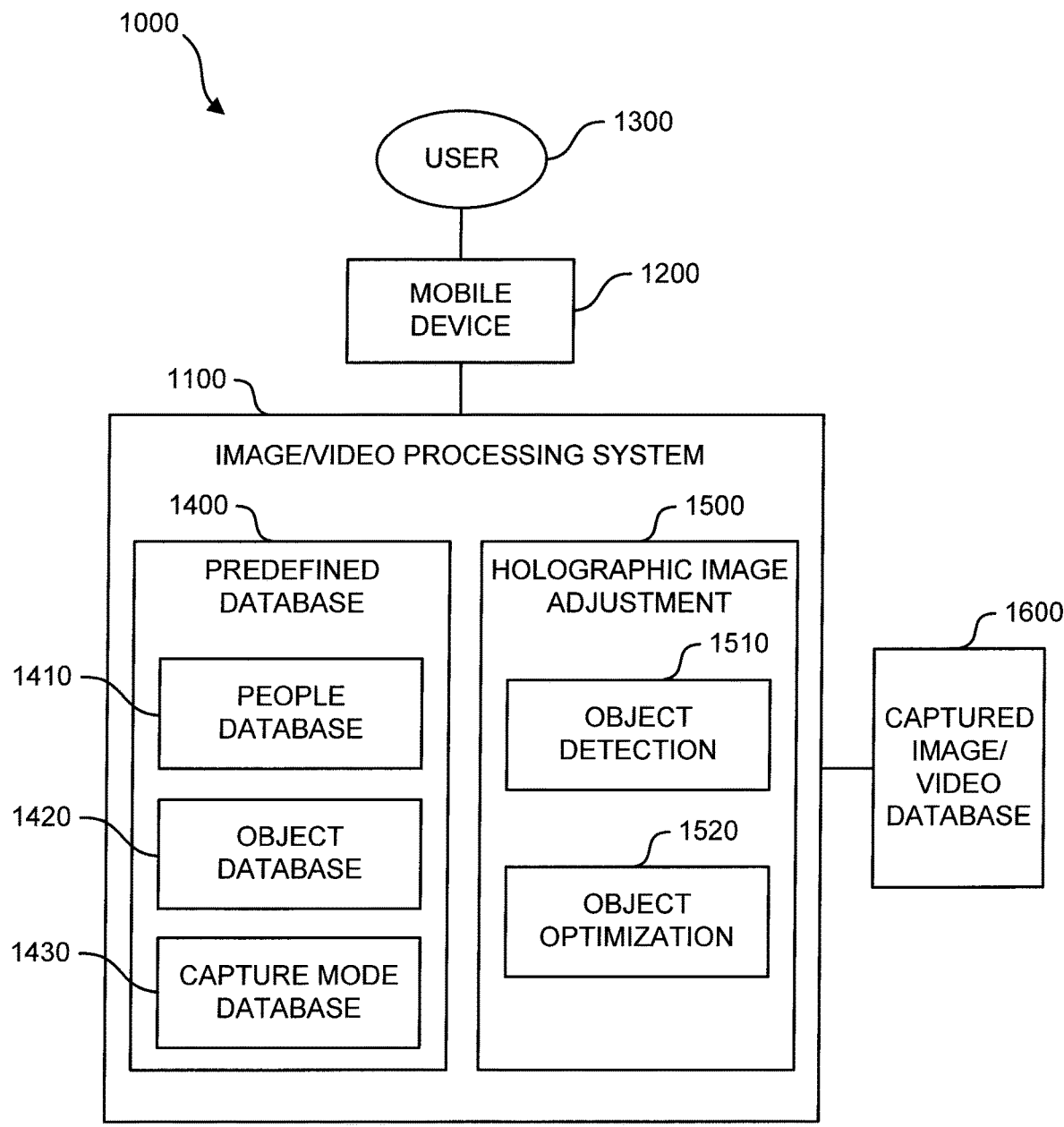
FIG. 10 depicts a system for obtaining an image or a video according to one or more embodiments set forth herein.

FIG. 10 depicts a system 1000 for obtaining an image or video of an object according to one or more embodiments set forth herein. System 1000 includes an image/video processing system 1100. Image/video processing system 1100 receives image frame data and user input data from a mobile device 1200 of a user 1300, as user 1300 obtained images or videos.

The image/video processing system 1100 includes a predefined database 1400, and an adjustment system 1500. Image/video processing system 1100 is coupled to an image and video database 1600 for storing captured images and videos. Predefined database 1400 may include, but are not limited to, a people database 1410, an object database 1420, and a capture mode database 1430. Capture mode database 1430 includes configuration modes for operation of mobile device 1200. Adjustment system 1500 may include, but are not limited to, objection detection 1510 and object optimization adjustment 1520. Object optimization adjustment may include facial recognition.

Certain embodiments herein may offer various technical systems and computing advantages, involving systems and computing advantages to address problems arising in the realm of image and/or video capture. Embodiments herein can be operable to provide systems, methods, computer program products, network devices, and virtual machine management software that may offer technical advantages including, for example, improving the ability, efficiency, and quality of capture of image and/or video data. Embodiments herein feature mobile devices having a system including a hologram emitter, an imager, and computer control for operably projecting and locating a holographic image and operably obtaining image data and/or video data off of a reflective surface of the holographic image. Embodiments herein feature the capability to obtain, from an imager of the mobile device, an image and/or a video of a reflection of an object disposed beyond an obstruction and overcome the problems of the obstruction being disposed along a line-of-sight between the mobile device and the object. Embodiments herein can include computerized processes to efficiency automatically adjust the projecting of the holographic image to optimize the reflected object and thereby optimize the resulting captured image data and/or video data of the object. Embodiments herein may be embodied in personal electronic devices such as smart devices, smartphones, or smartwatches to capture image and/or video data of objects. Implementation of the advantages of the various embodiments may enhance the performance of image and video capture, thereby increasing the efficiency image and video capture as a whole.

Figure 11:
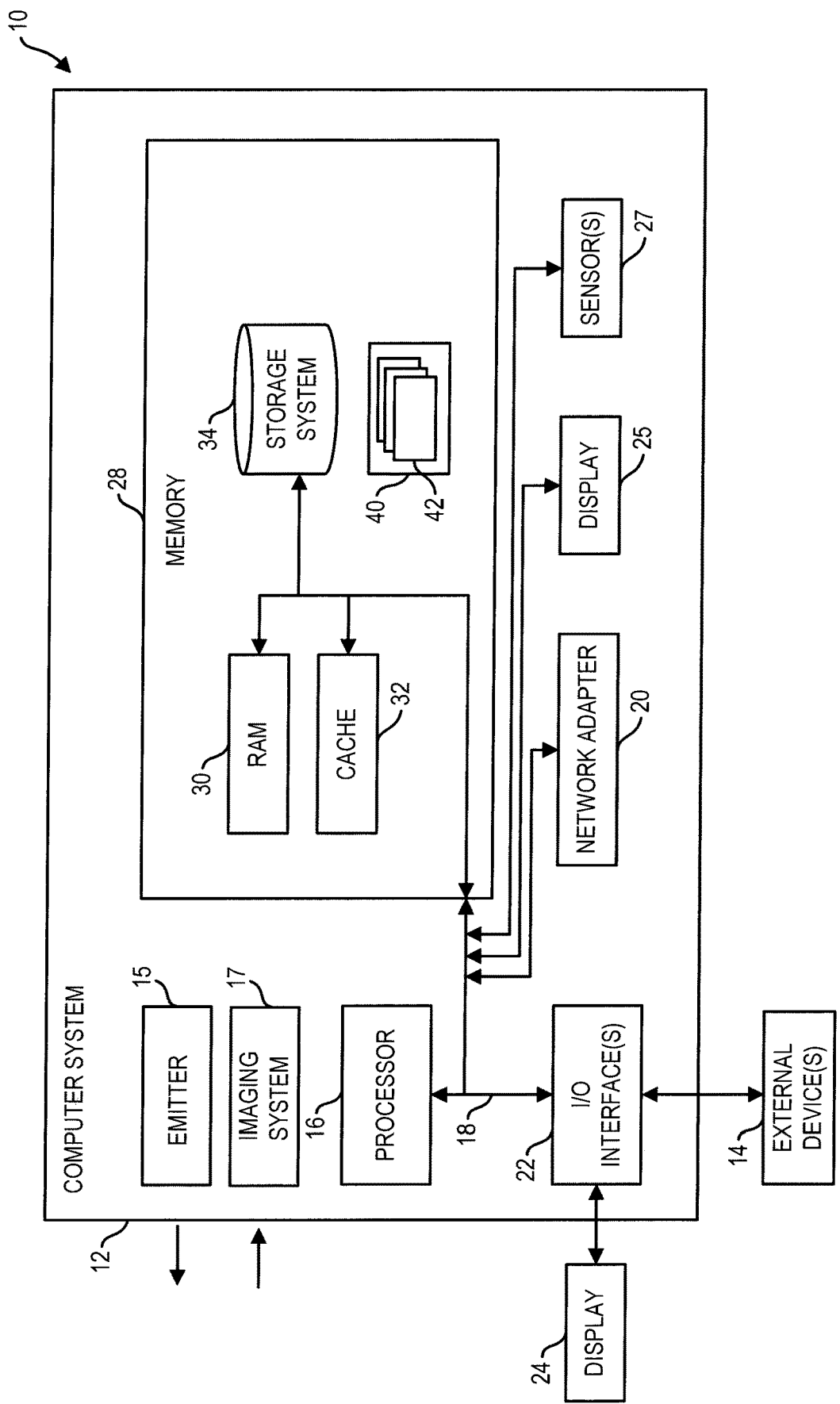
FIG. 11 depicts a computing node according to one embodiment.
Figure 12:
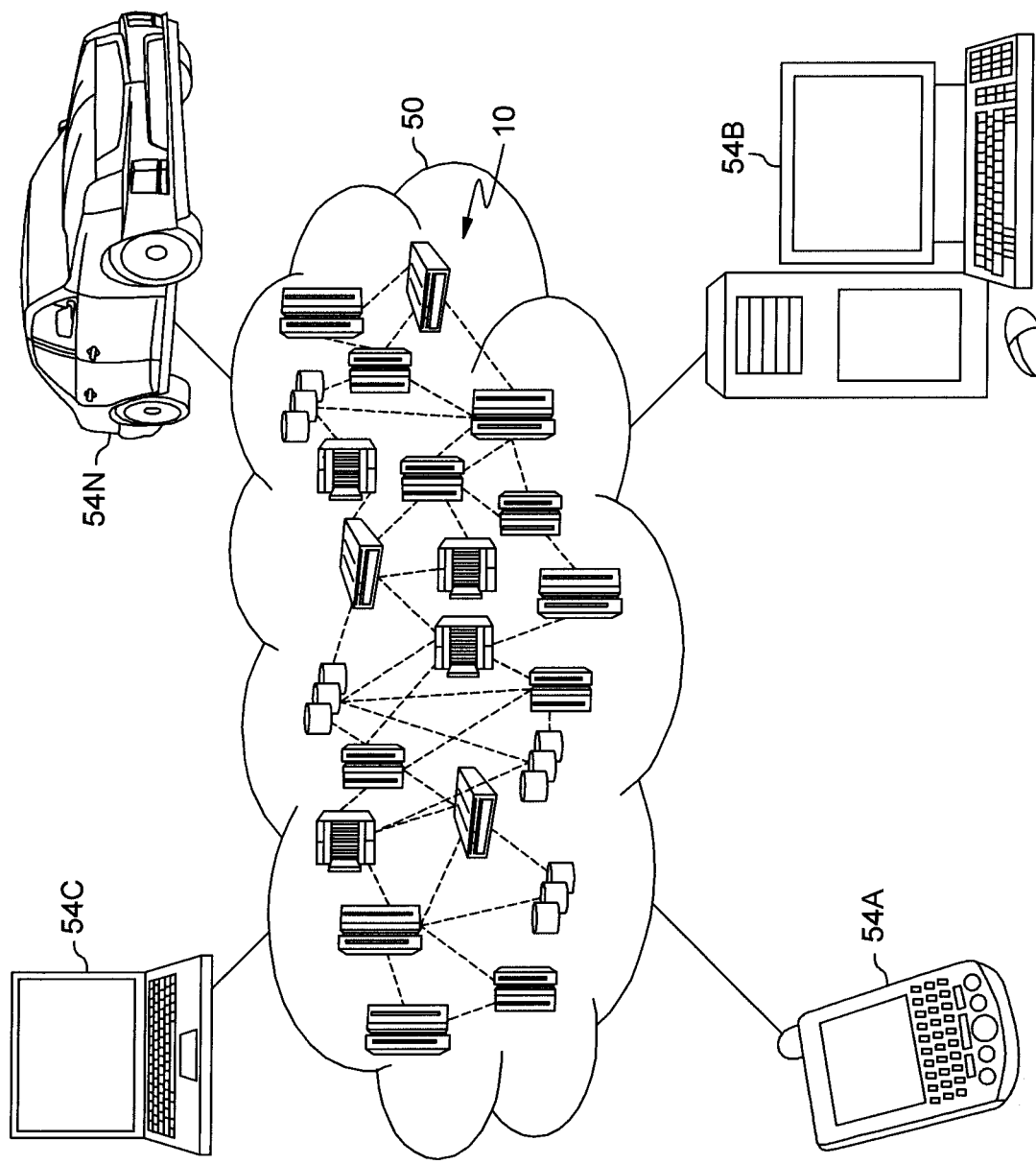
FIG. 12 depicts a cloud computing environment according to one embodiment.
Figure 13:
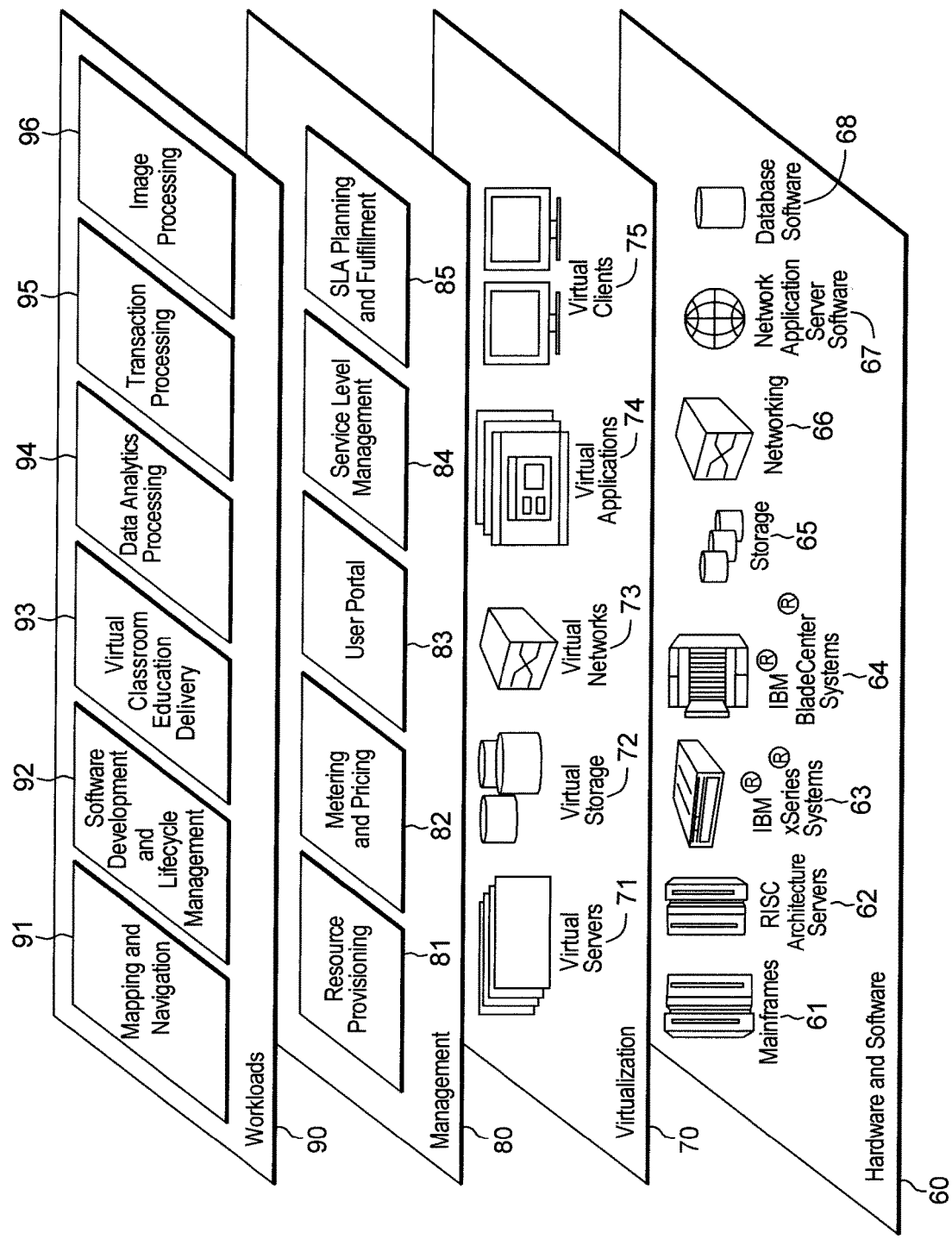
FIG. 13 depicts abstraction model layers according to one embodiment.

FIGS. 11-13 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 11, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 12 and 13.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, the processing for projecting the holographic images having a mirror-like surface at a position and location, detecting the object in the reflection of the object reflected off the holographic mirror-like surface, adjusting the position and orientation, and obtaining the image or video can include one or more computing node 10 and can include one or more program 40 for performing functions described with reference to various methods as are set forth herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera or imaging system 17, a gyroscope, a temperature sensor, a humidity sensor, a pulse sensor, a blood pressure (bp) sensor or an audio input device. Computer system 12 in one embodiment can also include a hologram emitter 15 operably connected to bus 18. Hologram emitter 15 can alternatively be connected through I/O interface(s) 22. Computer system 12 can include one or more network adapter 20. In FIG. 11 computing node 10 is described as being implemented in a cloud computing environment and accordingly is referred to as a cloud computing node in the context of FIG. 12.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for obtaining images and/or videos as set forth herein as set forth herein. The processing components 96 can be implemented with use of one or more program 40 described in FIG. 11.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Benefits of the present invention associated with obtaining an image or a video of one's self or others compared to conventional devices having a fixed camera relative to the mobile device and with a fixed line-of-sight relative to the mobile device include:

Allowing a user to take a picture of the user from different viewing angles from a mirror typical attached to a surface of a structure that supports the morrow. A user is able to take a picture at different angles facing the mirror or could get a back view if the user taking a picture at different angles over their shoulder into mirror.

The user can take photos or videos from a 360 view without the need to move or stage the photo or video.

Obtain photos and video objects such as people desired to be capture in the photo or the video which are positioned around a physical obstruction in the direct line-of-sight.

The mobile devices of the present invention may be operable for surveillance of subjects behind obstructions, reducing the need for additional conventional cameras in many locations around obstructions in order to cover the same observable volume.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A system comprising:
a mobile device having a hologram emitter, an imager, memory, at least one processor in communication with memory, and program instructions executable by one or more processor via the memory to perform a method comprising:
projecting, from the hologram emitter of the mobile device, a holographic image having a mirror-like reflective surface at a position and an orientation from the mobile device;
obtaining, from the imager of the mobile device, image data and/or video data of a reflection of an object reflected off the projected holographic mirror-like reflective surface; and
wherein the projecting comprises projecting, from the hologram emitter of the mobile device, the holographic image having the mirror-like reflective surface relative to an obstruction disposed along a line-of-sight between the mobile device and the object, and the obtaining comprises obtaining, from the imager of the mobile device, the image data or the video data, of the reflection of the object disposed beyond the obstruction.

2. The system of claim 1, wherein the method further comprises detecting, using the imager of the mobile device, the object in the reflection of the object reflected off the projected holographic mirror-like reflective surface, and wherein the obtaining comprises obtaining, from the imager of the mobile device in response to the detection of the object, the image data and/or video data of the reflection of the object reflected off the projected holographic mirror-like reflective surface.

3. The system of claim 1, wherein the method further comprises detecting, using the imager of the mobile device, the object in the reflection of the object reflected off the projected holographic mirror-like reflective surface corresponding to a predetermined object, and wherein the obtaining comprises obtaining, from the imager of the mobile device in response to the detected object, the image data and/or video data of the reflection of the object reflected off the projected holographic mirror-like reflective surface.

4. The system of claim 1, wherein the method further comprises detecting, using the imager of the mobile device, the object in the reflection of the object reflected off the projected holographic mirror-like reflective surface corresponding to a user input identifying the object, and wherein the obtaining comprises obtaining, from the imager of the mobile device in response to the detected object, the image data and/or video data of the reflection of the object reflected off the projected holographic mirror-like reflective surface.

5. The system of claim 1, wherein the method further comprises detecting, using the imager of the mobile device, the object in the reflection of the object reflected off the projected holographic mirror-like reflective surface, adjusting, in response to the detected object in the reflection of the object reflected off the projected holographic mirror-like reflective surface, at least one parameter of the hologram emitter of the mobile device to adjust the position and/or the orientation of the mirror-like reflective surface of the holographic image, and wherein the obtaining comprises obtaining, from the imager of the mobile device, image data and/or video data of the reflection of the object reflected off the adjusted projected holographic mirror-like reflective surface.

6. The system of claim 1, wherein the method further comprises detecting, using the imager of the mobile device, the object in the reflection of the object reflected off the projected holographic mirror-like reflective surface, adjusting, in response to the detected object in the reflection of the object reflected off the projected holographic mirror-like reflective surface, at least one parameter of the hologram emitter of the mobile device to adjust the position and/or the orientation of the projected holographic mirror-like reflective surface of the holographic image to optimize the reflection of the object reflected off the projected holographic mirror-like reflective surface, and wherein the obtaining comprises obtaining, from the imager of the mobile device, image data and/or video data of an optimized reflection of the object reflected off the adjusted projected holographic mirror-like reflective surface.

7. The system of claim 6, wherein the adjusting the at least one parameter of the hologram emitter of the mobile device is in response to facial recognition of the reflection of the object reflected off the projected holographic mirror-like reflective surface.

8. The system of claim 1, wherein the projecting the holographic image comprises projecting the holographic image having the mirror-like reflective surface to the left or to the right of the obstruction.

9. The system of claim 1, wherein the projecting the holographic image comprises projecting the holographic image having the mirror-like reflective surface beyond the obstruction.

10. The system of claim 1, wherein the method further comprises detecting, using the imager of the mobile device, the object in the reflection of the object beyond the obstruction reflected off the projected holographic mirror-like reflective surface, and wherein the obtaining comprises obtaining, from the imager of the mobile device in response to the detection of the object, the image data and/or video data of the reflection of the object beyond the obstruction reflected off the projected holographic mirror-like reflective surface.

11. The system of claim 1, wherein the method further comprises detecting, using the imager of the mobile device, the object in the reflection of the object beyond the obstruction reflected off the projected holographic mirror-like reflective surface corresponding to a predetermined object, and wherein the obtaining comprises obtaining, from the imager of the mobile device in response to the detected object, the image data and/or video data of the reflection of the object beyond the obstruction reflected off the projected holographic mirror-like reflective surface.

12. The system of claim 1, wherein the method further comprises detecting, using the imager of the mobile device, the object in the reflection of the object beyond the obstruction reflected off the projected holographic mirror-like reflective surface corresponding to a user input identifying the object, and wherein the obtaining comprises obtaining, from the imager of the mobile device in response to the detected object, the image data and/or video data of the reflection of the object beyond the obstruction reflected off the projected holographic mirror-like reflective surface.

13. The system of claim 1, wherein the method further comprises detecting, using the imager of the mobile device, the object in the reflection of the object beyond the obstruction reflected off the projected holographic mirror-like reflective surface, adjusting, in response to the detected object in the reflection of the object reflected off the projected holographic mirror-like reflective surface, at least one parameter of the hologram emitter of the mobile device to adjust the position and/or the orientation of the projected holographic mirror-like reflective surface of the holographic image, and wherein the obtaining comprises obtaining, from the imager of the mobile device, image data and/or video data of the reflection of the object beyond the obstruction reflected off the adjusted projected holographic mirror-like reflective surface.

14. The system of claim 1, wherein the method further comprises detecting, using the imager of the mobile device, the object in the reflection of the object beyond the obstruction reflected off the projected holographic mirror-like reflective surface, adjusting, in response to the detected object in the reflection of the object reflected off the projected holographic mirror-like reflective surface, at least one parameter of the hologram emitter of the mobile device to adjust the position and/or the orientation of the mirror-like reflective surface of the holographic image to optimize the reflection of the object beyond the obstruction reflected off the projected holographic mirror-like reflective surface, and wherein the obtaining comprises obtaining, from the imager of the mobile device, image data and/or video data of the optimized reflection of the object beyond the obstruction reflected off the adjusted projected holographic mirror-like reflective surface.

15. The system of claim 14, wherein the adjusting the at least one parameter of the hologram emitter of the mobile device is in response to facial recognition of the reflection of the object reflected off the projected holographic mirror-like reflective surface.

16. A method comprising:
projecting, from a hologram emitter of a mobile device, a holographic image having a mirror-like reflective surface at a position and an orientation from the mobile device;
obtaining, from an imager of the mobile device, image data and/or video data of a reflection of an object reflected off the projected holographic mirror-like reflective surface; and wherein:
the projecting comprises projecting, from the hologram emitter of the mobile device, the holographic image having the mirror-like reflective surface relative to an obstruction disposed along a line-of-sight between the mobile device and the object and
the obtaining comprises obtaining, from the imager of the mobile device, the image data or the video data, of the reflection of the object disposed beyond the obstruction.

17. A computer program product comprising:
a computer readable storage medium readably by one or more processing circuit and storing instructions for execution by one or more processor for performing a method comprising:
projecting, from a hologram emitter of a mobile device, a holographic image having a mirror-like reflective surface at a position and an orientation from the mobile device;
obtaining, from an imager of the mobile device, image data and/or video data of a reflection of an object reflected off the projected holographic mirror-like reflective surface; and wherein:
the projecting comprises projecting, from the hologram emitter of the mobile device, the holographic image having the mirror-like reflective surface relative to an obstruction disposed along a line-of-sight between the mobile device and the object; and
the obtaining comprises obtaining, from the imager of the mobile device, the image data or the video data, of the reflection of the object disposed beyond the obstruction.

* * * * *